Feb. 11, 1936.     R. L. SMITH     2,030,770
WEED PULLER
Filed May 21, 1935
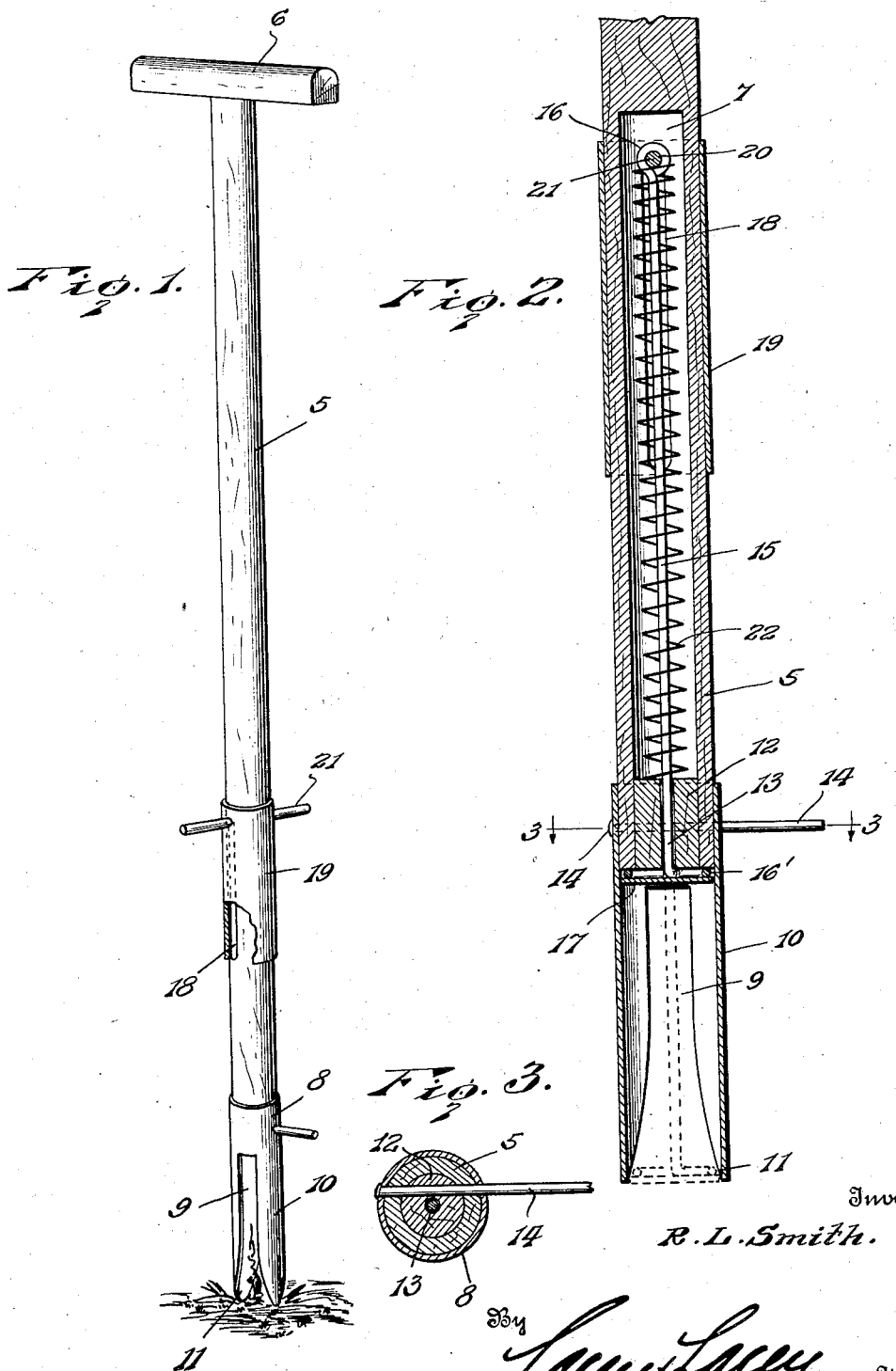

Patented Feb. 11, 1936

2,030,770

UNITED STATES PATENT OFFICE 2,030,770

WEED PULLER

Robert L. Smith, Lynchburg, Va., assignor of forty-nine per cent to Edgar M. Shaner, Lynchburg, Va.

Application May 21, 1935, Serial No. 22,617

5 Claims. (Cl. 55—65)

This invention relates to weed pullers or extractors, and has for its object to provide a comparatively simple, inexpensive and thoroughly efficient device of this character by means of which garlic, weeds and other noxious growths may be conveniently extracted from the ground with the roots thereof intact so as to prevent further growth of the plants.

A further object of the invention is to provide a weed extractor including spaced cutting blades or knives adapted to penetrate the ground at the opposite sides of the plant to be extracted and between which is slidably mounted an ejecting device, means being provided for automatically returning the ejecting device to normal or inoperative position after each operation of the implement.

A further object is to provide the shank or staff of the implement with spaced slots normally closed by a sliding collar having a pin extending transversely therethrough and to which the ejecting device is anchored, the opposite ends of the pin being extended laterally beyond the walls of the collar to form ejector operating members.

A still further object of the invention is generally to improve this class of devices so as to increase their utility, durability and efficiency.

In the accompanying drawing, forming a part of this specification, and in which similar numerals of reference indicate corresponding parts in all the figures of the drawing, Figure 1 is a perspective view of a weed puller or extractor constructed in accordance with the present invention, a portion of the sliding collar being broken away to show the location of the pin receiving slots.

Figure 2 is an enlarged vertical sectional view of the lower portion of the implement.

Figure 3 is a transverse sectional view, taken on the line 3—3 of Figure 2.

The improved weed extractor forming the subject-matter of the present invention includes a shank or staff 5 of any desired length and formed of wood, metal, or other suitable material, said shank having its upper end provided with a transverse bar constituting a handle 6 and its lower end formed with a longitudinally disposed recess or chamber 7. Secured to the lower end of the shank 5 is a tubular member 8 having its lower portion bifurcated at 9 to form spaced concavo-convex cutting knives or blades 10, the free ends of which are relatively sharp and pointed, as indicated at 11, so as to permit the knives to penetrate the ground at opposite sides of a growing plant, as best shown in Figure 1 of the drawing.

Fitted in the lower end of the recess or chamber 7 is a closure plug 12 having a vertical opening 13 formed therein and this plug is secured within the chamber 7 by means of a pin 14 which extends through the tubular member 8 and said plug and has one end thereof projected laterally beyond the tubular member to form a step 14 adapted to receive the foot of the user for the purpose of forcing the blades into the ground.

Mounted for reciprocation between the blades 10 is a plant ejector comprising a stem 15, the upper end of which is formed into an eye 16, while the lower end thereof is slidably received within the recess 13 and is bent or coiled into flat form, as indicated at 16', and to which flat or coiled portion is soldered or otherwise secured a disc 17. The walls of the staff 5 at the upper portion of the chamber 7 are formed with oppositely disposed slots 18 and slidably mounted on the staff and normally closing said slots is a sleeve or collar 19. Extending through the sleeve 19 and the eye 16 of the rod 15 is a transverse pin 20 and the opposite ends of this pin are projected laterally beyond the outer wall of the sleeve 19 to form extensions 21 which may be depressed either by the action of the hand or foot for the purpose of actuating the tubular member. Disposed within the chamber 7 and surrounding the rod 15 is a coil spring 22, one end of which bears against the closure plug 12, while the other end thereof engages the transverse pin 20, and this spring serves to automatically return the ejector to normal or retracted position after each operation of the implement. It will here be noted that the transverse pin 20 not only serves to anchor the upper end of the ejector but also constitutes the means for operating the ejector.

In operation, the implement is positioned over a growth of garlic or other plant to be extracted and the blades 10 forced into the ground at opposite sides thereof by exerting a slight downward pressure with the foot on the pin 14, thereby causing the blades to encompass the roots of the plant and force the adjacent soil between the blades. The implement is then withdrawn from the ground carrying with it the weed with its root intact and with the adjacent soil adhering thereto. By then exerting a slight downward pressure on the operating members 21, the ejector will force the extracted weed from between the blades 10 and upon release of pressure on the members 21, the coil spring 22 will automatically return the ejector to normal or inoperative position so that the implement will again be in condition for extracting other weeds.

The device is very simple in construction and efficient in operation and will expeditiously extract all kinds of noxious growths with very little effort on the part of the operator. It will, of course, be understood that the implements may be made in different sizes and shapes and constructed of any suitable material without departing from the spirit of the invention.

Having thus described the invention, what is claimed as new is:

1. A weed extractor comprising a shank having spaced slots formed therein, cutting blades secured to one end of the shank, a sleeve slidably mounted on the shank and normally closing the slots therein, an ejector mounted for reciprocation between the blades, a pin carried by the sleeve and having its intermediate portion anchored to the ejector and its opposite ends projected laterally to form operating pins for moving the ejector to extended position, and a spring disposed within the shank and operatively connected with the ejector for returning the ejector to retracted position.

2. A weed extractor comprising a shank, spaced cutting blades secured to one end of the shank, an ejector slidably mounted between the blades and provided with a stem terminating in an eye, there being slots formed in the shank adjacent said eye, a sleeve slidably mounted on the shank and normally closing the slots, a transverse pin extending through the eye and having its opposite ends projected laterally beyond the sleeve to form operating members, and a spring connected with the ejector for normally holding the ejector in retracted position.

3. A weed extractor comprising a shank having a chamber therein and opening through one end thereof, a plug forming a closure for the open end of the chamber, blades secured to the shank at said closure, a pin extending transversely through the blades and closure and terminating in a foot piece, there being longitudinal slots formed in the walls of the shank and communicating with said chamber, a sleeve slidably mounted on the shank and normally closing said slots, an ejector having a head slidably mounted between the blades and provided with a stem terminating in an eye, a transverse pin carried by the sleeve and extending through said eye, the ends of the pin being extended laterally to form operating members, and a coil spring having one end thereof bearing against the closure plug and its other end engaging said pin.

4. A weed extractor comprising a shank having spaced slots formed therein, a sleeve slidably mounted on the shank and normally closing said slots, a tubular member secured to the lower end of the shank and bifurcated to form spaced blades, an ejector comprising a stem having one end thereof formed with an eye and its other end coiled in flat formation, a disc secured to the coiled end of the stem, a pin extending through the sleeve and the eye in the stem, the opposite ends of said pin being extended laterally to form operating members, and a coil spring surrounding the stem of the ejector for normally holding the ejector in retracted position.

5. A weed extractor comprising a shank having its lower end formed with a longitudinally disposed chamber, a handle secured to the other end of the shank, there being longitudinal slots formed in the shank and communicating with the chamber, a sleeve slidably mounted on the shank and normally closing the slots therein, a plug forming a closure for the lower end of the chamber and provided with a vertical recess, spaced cutting blades secured to the shank at said plug, an ejector having a head slidably mounted between the blades and provided with a stem extending through the recess in the plug and terminating in an eye, a transverse pin carried by the sleeve and extending through said eye, and a spring disposed within the chamber around the stem and having one end thereof bearing against the plug and its opposite end bearing against said transverse pin, the opposite ends of the pin being extended laterally beyond the exterior wall of the sleeve to form operating members.

ROBERT L. SMITH.